Dec. 20, 1966 B. E. NICHOLSON 3,293,486

LINEARITY CORRECTION CIRCUIT

Filed April 3, 1964

INVENTOR.
BURNARD EUGENE NICHOLSON
BY
W. H. Sponagle
Attorney

United States Patent Office 3,293,486
Patented Dec. 20, 1966

3,293,486

LINEARITY CORRECTION CIRCUIT

Burnard E. Nicholson, Haddonfield, N.J., assignor to Radio Corporation of America, a corporation of Delaware Filed Apr. 3, 1964, Ser. No. 357,025
5 Claims. (Cl. 315—27)

Figure 2:
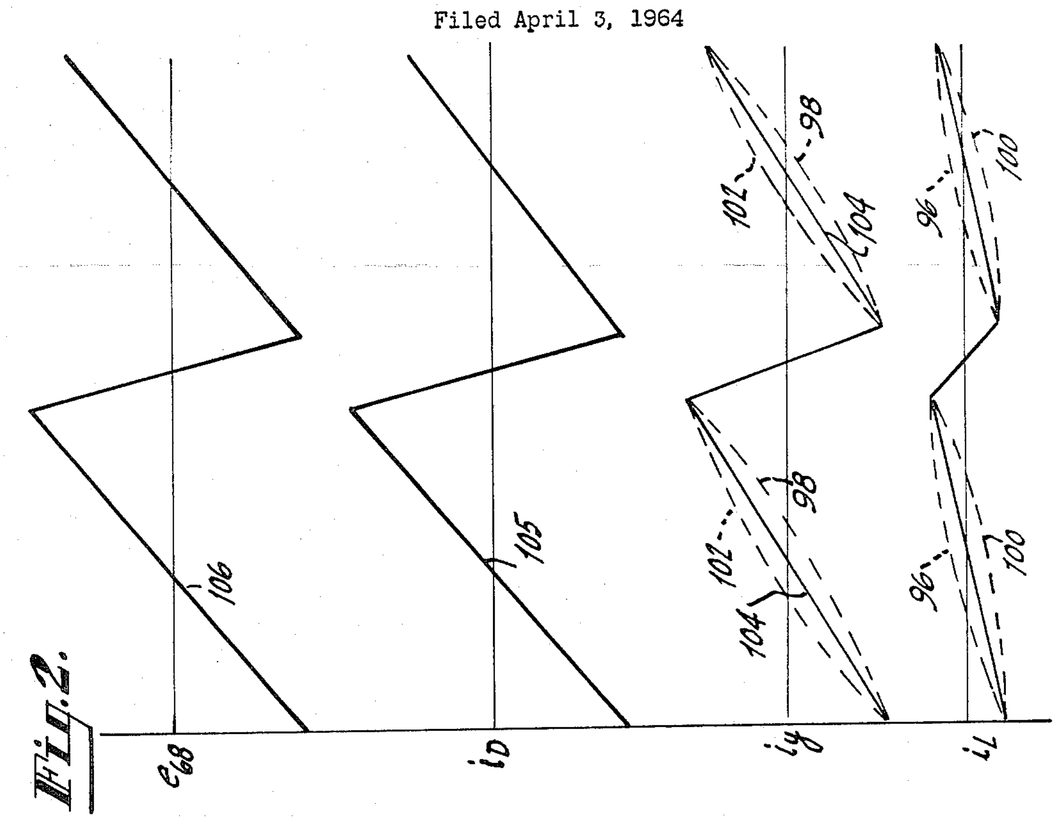

This invention relates to circuit arrangements for providing electromagnetic deflection of an electron beam in a cathode ray device. The invention relates more particularly to means for improving linearity in the deflection of the electron beam.

Various electrical apparatus utilizing cathode ray devices employ deflection circuit means for electromagnetically scanning an electron beam across a target of the device. A deflection winding is positioned about a segment of the device and a current which is caused to flow in the winding establishes a periodically varying electromagnetic field for scanning the electron beam.

It is often desirable to provide conformity between a waveform of current flowing in the deflection winding and a waveform of a deflection circuit input signal. For example, electron beam deflection linearity is improved by employing a deflection circuit which is arranged to cause the waveform of deflection current to correspond with the waveform of a linear input signal.

A deflection circuit which provides this function includes a differential amplifier and means for applying the input signal and a signal representative of deflection winding current to the amplifier. The amplifier is adapted to detect deviations between the waveforms of these signals and to automatically alter deflection winding current until waveform correspondence is established.

Although an arrangement of this type causes the waveform of deflection winding current and input signal to correspond with a relatively high degree of accuracy, other factors outside of the control of the amplifier cause deviations from the desired linearity in electron beam scanning. For example, an unbalanced deflection winding can cause a nonlinear electron beam deflection even though the waveforms of deflection winding current and input signal correspond. It is thus desirable to provide linearity correction circuit means to compensate for nonlinearities in electron beam scan resulting from factors outside of the control of the differential amplifier.

In providing a linearity correction, prior deflection circuits have included circuit means arranged outside of a control loop of the differential amplifier. Such an arrangement avoids automatic recorrection by the amplifier of a deflection variation introduced by the linearity correction means. The linearity correction is accomplished by varying the shape of a trace segment of the input signal waveform until linear beam deflection is effected. The modified input signal thus causes a linear beam deflection and provides a waveform with which the waveform of deflection winding current is compared for detecting deviations from linearity.

In certain apparatus, the differential amplifier input signal serves as a deflection reference and a modification of the signal to provide linearity correction avoids the function of the signal as a reference. For example, some color television broadcast apparatus utilize an image orthicon for generating a luminance signal component of a scene to be televised and a plurality of vidicons for generating color signal components of the scene. Proper operation of the apparatus requires that electron beams of the vidicons accurately track an electron beam of the image orthicon. A differential amplifier form of deflection circuit is generally employed to provide vidicon beam deflection. For providing accurate tracking, an input signal to the vidicon differential amplifier comprises a signal, derived from the image orthicon deflection circuit, and which is representative of image orthicon deflection winding current. A modification of this input signal to provide vidicon linearity correction as hereinbefore described distorts the deflection intelligence contained in the signal and inhibits the desired tracking.

Accordingly, it is an object of the present invention to provide improved linearity correction circuit means for a differential amplifier form of electromagnetic deflection circuit.

Another object of this invention is to provide an improved adjustable linearity correction circuit means for a differential amplifier form of electromagnetic deflection circuit.

A further object of the invention is to provide in an electromagnetic deflection circuit of the differential amplifier type, an adjustable linearity correction means which is arranged in a signal correction loop of the differential amplifier and which is adapted to vary a waveform of deflection winding current and inhibit automatic recorrection of this variation by the amplifier.

Still another object of the present invention is to provide a deflection circuit having a differential amplifier and relatively simple and inexpensive, adjustable, linearity correction circuit means arranged in a control loop of the amplifier.

In accordance with the present invention, an electromagnetic deflection circuit includes an electron beam deflection winding, an amplifier stage arranged for providing conformity between the waveform of a deflection circuit output current and the waveform of an input signal, means for applying an input signal to the amplifier, means for applying a signal representative of the deflection current output current to the amplifier for comparison with the input signal, and linearity correction circuit means coupled in parallel with the deflection winding. Electrical parameters of the correction circuit means are selected to provide a linearity correcting variance between a waveform of current in the deflection winding and the input signal waveform, and, for providing that the waveform of input signal and output current conform.

Figure 1:
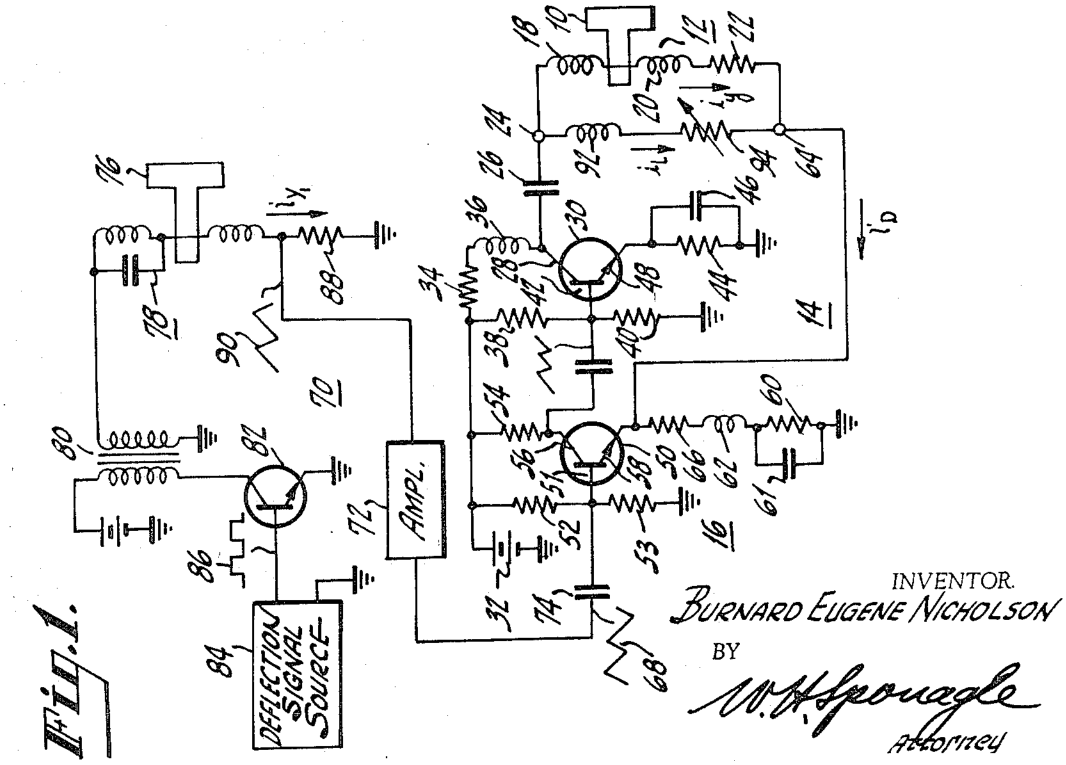

These and other features of the invention will become apparent with reference to the following specifications and drawings in which:

FIGURE 1 is a diagram, partially in block and partially in schematic form, of a deflection circuit arrangement utilizing an embodiment of the present invention; and, FIGURE 2 is a diagram illustrating waveforms of various currents flowing in the deflection circuit arrangement of FIGURE 1.

Referring now to FIGURE 1, a deflection circuit arrangement for providing electromagnetic deflection of an electron beam in a cathode ray device 10 includes a deflection winding indicated generally as 12, an output amplifier indicated generally as 14, and a differential amplifier indicated generally as 16. The deflection winding includes winding segments 18 and 20 and an equivalent resistance 22 which represents the wire resistance of the windings 18 and 20. A terminal 24 of the deflection winding is coupled by a direct current blocking capacitor 26 to a collector electrode 28 of an output amplifier transistor 30.

The output transistor 30 is arranged in a common emitter amplifier configuration. Direct current operating potential is derived from a source 32 and is applied to a collector electrode of the transistor 30 through a load resistance 34 of relatively small value and a choke 36. Resistors 38 and 40, which are connected to a base electrode 42, and a resistor 44 and by pass capacitor 46, which are connected to an emitter electrode 48, bias the transistor 30 for substantially linear amplification.

The differential amplifier 16 includes a transistor 50 and is similarly arranged as a linear common emitter amplifier. Bias at a base electrode 51 is provided by the resistors 52 and 53. A load resistor 54 is connected between the source of potential 32 and a collector electrode 56. Bias is also provided at an emitter electrode 58 by a resistor 60 and a by-pass capacitor 61. An inductor 62 provides high frequency compensation for the amplifier. The emitter electrode 58 is coupled to another terminal 64 of the deflection winding 12 and a feedback resistor 66 generates at the emitter electrode 58 a signal having a waveform which is representative of the deflection circuit output current, $i_d$.

Means for providing and applying an input signal 68 to the differential amplifier comprises a deflection circuit indicated generally as 70, an amplifier 72 and a coupling capacitor 74. The deflection circuit 70 includes a cathode ray device 76, a deflection winding indicated generally as 78, an output transformer 80, an output amplifier transformer 82 and a source 84 of deflection signal 86. A resistor 88 is coupled in series with the deflection winding 78, and a sawtooth current which is caused to flow both in the winding 78 and the resistor 88 by the deflection circuit 70, generates a signal voltage 90 across the resistor 88. The voltage 90 is representative of current flowing in the deflection winding.

Although the sources of the input signal 68 is shown in FIGURE 1 to be a deflection circuit, other sources of an input signal for the differential amplifier may be provided. The arrangement of FIGURE 1 is particularly applicable for use with color television broadcast apparatus. When so utilized, the cathode ray device 76 comprises a pickup device such as an image orthicon for generating a luminance component of a signal to be televised and the cathode ray device 10 represents a vidicon device for generating a chrominance signal component of the scene. In this case a scanning electron beam in the device 10 is required to accurately track the scan of the electron beam of the device 76.

In providing waveform correspondence between the input signal 68 and a waveform of deflection circuit output current, the differential amplifier compares these waveforms and causes the waveform of output current to vary in a manner for establishing waveform conformity. More specifically, the signal 68 and a signal developed across a resistor 66 by the output current, $i_d$ (FIGURE 2) are of the same polarity. When these waveforms differ, a differential correction voltage is developed between the base and emitter electrodes. A composite alternating signal between base and emitter electrodes comprises the sum of the input signal 68 and this differential voltage. Output current is automatically altered until the differential correction voltage is reduced to zero.

As indicated hereinbefore, it is desirable to provide means for correcting linearity of electron beam deflection in the device 10 while both maintaining the waveform of input signal 68 in an unaltered form and avoiding automatic recorrection of the linearity/correcting alteration by the differential amplifier. Circuit means comprising an inductor 92 and a resistor 94 are coupled in parallel with the deflection winding 12 for performing this function. The electrical parameters of the inductance 92 and resistor 94 are adapted to cause an electron beam linearity correcting variance in a waveform of the deflection winding current, $i_y$ (FIGURE 2), while simultaneously providing that the waveform of the deflection circuit output current, $i_d$ (FIGURE 2) conform with the input signal 68, hereinafter referred to as $e_{68}$. More specifically, when the relation $$\frac{R_{94}}{L_{92}}=\frac{R_{22}}{L_{12}}$$

exists, then the waveform of current $i_y$ flowing in the deflection winding, the waveform of current $i_l$ flowing in the linearity correcing circuit means, and the waveform of deflection circuit output current $i_d$ conform. The deflection winding current $i_y$ therefore conforms with the waveform of the signal $e_{68}$. An increase or decrease in the resistance 94 can cause the waveform of the deflection winding current $i_y$ to vary in a manner for correcting nonlinearities introduced by factors outside of the control loop of the differential amplifier. A differential amplifier may be viewed as causing the deflection circuit to operate as a constant current source. Accordingly, the current $i_l$ will vary in an opposite manner with respect to the current $i_y$ and the deflection circuit output current $i_d$ remains unaltered.

The current waveforms of $i_l$, $i_y$, and $i_d$ of FIGURE 2 illustrate this reaction. A decrease in the resistance 94 causes a waveform of current $i_l$ to vary as is indicated by the dotted line trace segment 96, and a waveform of the current $i_y$ to simultaneously vary as indicated by the dotted line trace segment 98. Conversely, an increase in resistance 94 causes the waveform of current $i_l$ to vary as is indicated by the dotted line trace segment 100 and the waveform of current $i_y$ to vary as is indicated by the dotted line trace segment 102. Since the circuit appears as a constant current source and since the current $i_d=i_y+i_l$, the waveform of current $i_d$ remains unaltered and tracks the waveform $e_{68}$. The waveforms of current $i_y$ as illustrated by the trace segments 98 and 102 provide for a linear electron beam trace. By adjustment of the value of the resistor 94, other degrees of linearity correction may be achieved. Thus, the undesired nonlinearities are corrected, tracking is maintained, and automatic recorrection of the linearity correction adjustment by the differential amplifier is avoided.

When utilized with television apparatus, the sawtooth input signal 68 may comprise a horizontal scanning signal having a repetition rate of 15,750 cycles per second. The inductive reactance of the inductance 92 at this frequency is substantially larger than the impedance of the resistor 94. Consequently, adjustments of the resistor 94 can provide a desired linearity correction which advantageously has little effect upon the peak-to-peak amplitude of the deflection current $i_d$ and a desired width of electron beam scan remains substantially unaltered.

A circuit arrangement has been described for use with a differential amplifier which advantageously corrects nonlinearities in electron beam deflection which result from factors outside a control loop of the amplifier. The desired arrangement further advantageously provides linearity correction while both leaving an input signal waveform unaltered and avoiding reaction by the amplifier to the linearity correction alteration.

While there is illustrated, described and pointed out in the annexed claims certain novel features of the invention, it will be understood that certain variations, omissions, and substitutions in the forms and details of the system illustrated may be made by those skilled in the art without departing from the spirit of the invention and the scope of the claims.

What is claimed is:

1. A circuit arrangement for providing electromagnetic deflection of an electron beam in a cathode ray device, comprising:

a cathode ray device;

a deflection output circuit having a deflection winding positioned with respect to said device for deflecting an electron beam thereof and linearity correction circuit means coupled in parallel with said deflection winding;

an amplifier coupled to said output circuit for causing a cyclical output circuit current, $i_d$, to flow in said deflection output circuit in response to a cyclical input signal;

said amplifier including an amplifying stage having an amplifying device;

means for applying a cyclical input signal and a signal having a waveform conforming to said output circuit current waveform to said amplifying device;

said amplifier adapted for varying output circuit current, $i_d$, for providing correspondence in linearity between a waveform of said input signal and a waveform of said output current, said linearity correction circuit comprising electrical circuit elements adapted for causing a waveform of current which flows in said deflection winding to vary from the waveform of said output circuit current, $i_d$, in a manner for providing a linear deflection of said electron beam in said cathode ray device.

2. A circuit arrangement for providing electromagnetic deflection of an electron beam in a cathode ray device, comprising:

a cathode ray device;

a deflection output circuit having a deflection winding positioned with respect to said device for deflecting an electron beam thereof and linearity correction circuit means coupled in parallel with said deflection winding;

an amplifier coupled to said output circuit for causing a cyclical output circuit current, $i_d$, to flow in said deflection output circuit in response to a cyclical input signal;

said amplifier including an amplifying stage having an amplifying device;

means for applying a cyclical input signal and a signal having a waveform conforming to said output circuit current waveform to said amplifying device;

said amplifier adapted for varying output circuit current, $i_d$, for providing correspondence in linearity between a waveform of said input signal and a waveform of said output current, said linearity correction circuit comprising an inductance and resistance arranged in series, said inductance and resistance having electrical impedance characteristics for causing a waveform of current $i_y$ which flows in said deflection winding to vary with respect to the waveform of said output circuit $i_d$ in a manner for providing a linear deflection of said electron beam in said cathode ray device and a waveform of current $i_1$ which flows in said correction circuit to vary in a complementary manner with respect to the waveform of circuit $i_y$.

3. A circuit arrangement for providing electromagnetic deflection of an electron beam in a cathode ray device, comprising:

a cathode ray device;

a deflection output circuit having a deflection winding positioned with respect to said device for deflecting an electron beam thereof and linearity correction circuit means coupled in parallel with said deflection winding;

an amplifier coupled to said output circuit for causing a cyclical output circuit current, $i_d$, to flow in said deflection output circuit in response to a cyclical input signal;

said amplifier including an amplifying stage having an amplifying device;

means for applying a cyclical input signal of frequency $f_h$ and a signal having a waveform conforming to said output circuit current waveform to said amplifying device;

said amplifier adapted for varying output circuit current, $i_d$, for providing correspondence in linearity between a waveform of said input signal and a waveform of said output current, said linearity correction circuit comprising an inductance and resistance which provides a relatively higher impedance with respect to said deflection winding at the frequency $f_h$, said inductance adapted to provide a relatively higher impedance with respect to the impedance of the resistance at the frequency $f_h$.

4. A deflection circuit arrangement for providing electromagnetic deflection of an electron beam in a cathode ray device comprising:

a cathode ray device;

a deflection output circuit having a deflection winding positioned with respect to said device for deflecting an electron beam therein, and an inductance and an adjustable resistance coupled in series across said deflection winding;

a differential amplifier stage, having a first amplifying device;

an amplifying stage having a second amplifying device coupled to said deflection winding and arranged for linear amplification of an input signal;

means for coupling an output electrode of said first amplifying device to an input electrode of said second device;

means coupling an input signal to an input electrode of said first device;

means including a resistor coupled to a second input electrode of said first amplifying device;

means coupling said deflection winding to said latter resistive impedance for carrying a signal having a waveform conforming to said waveform of current $i_d$ flowing in said deflection output circuit to be generated at said second electrode of said first amplifying device.

5. The circuit arrangement of claim 4 wherein said deflection winding is coupled to said second resistive impedance for causing a negative feedback signal having a waveform conforming to said current $i_d$ flowing in said output circuit to be generated at said input second electrode of said first amplifying device.

References Cited by the Examiner

UNITED STATES PATENTS 2,686,276 8/1954 Anderson ____________ 315—27

DAVID G. REDINBAUGH, *Primary Examiner.*

T. A. GALLAGHER, *Assistant Examiner.*